United States Patent
Kawato et al.

(10) Patent No.: US 10,953,642 B2
(45) Date of Patent: Mar. 23, 2021

(54) LAMINATE AND PACKAGING BODY COMPRISING SAME

(71) Applicant: TOSOH CORPORATION, Shunan (JP)

(72) Inventors: Daisuke Kawato, Yokkaichi (JP); Shingo Kouda, Yokkaichi (JP); Shigeki Iwamoto, Yokohama (JP)

(73) Assignee: TOSOH CORPORATION, Shunan (JP)

( * ) Notice: Subject to any disclaimer, the term of this patent is extended or adjusted under 35 U.S.C. 154(b) by 547 days.

(21) Appl. No.: 15/521,942

(22) PCT Filed: Oct. 23, 2015

(86) PCT No.: PCT/JP2015/079971
§ 371 (c)(1),
(2) Date: Apr. 26, 2017

(87) PCT Pub. No.: WO2016/068041
PCT Pub. Date: May 6, 2016

(65) Prior Publication Data
US 2017/0326854 A1   Nov. 16, 2017

(30) Foreign Application Priority Data
Oct. 28, 2014   (JP) ............................. JP2014-219398

(51) Int. Cl.
| | | |
|---|---|---|
| B32B 27/32 | (2006.01) | |
| B32B 27/34 | (2006.01) | |
| B32B 27/36 | (2006.01) | |
| B32B 7/12 | (2006.01) | |
| B32B 27/08 | (2006.01) | |
| B32B 27/30 | (2006.01) | |
| B32B 15/06 | (2006.01) | |
| B32B 15/08 | (2006.01) | |
| B32B 15/12 | (2006.01) | |
| B32B 15/20 | (2006.01) | |
| B32B 25/14 | (2006.01) | |
| B32B 15/00 | (2006.01) | |

(52) U.S. Cl.
CPC .............. *B32B 27/32* (2013.01); *B32B 7/12* (2013.01); *B32B 15/06* (2013.01); *B32B 15/08* (2013.01); *B32B 15/12* (2013.01); *B32B 15/20* (2013.01); *B32B 25/14* (2013.01); *B32B 27/08* (2013.01); *B32B 27/306* (2013.01); *B32B 27/34* (2013.01); *B32B 27/36* (2013.01); *B32B 15/00* (2013.01); *B32B 2250/02* (2013.01); *B32B 2250/24* (2013.01); *B32B 2255/10* (2013.01); *B32B 2255/205* (2013.01); *B32B 2270/00* (2013.01); *B32B 2307/31* (2013.01); *B32B 2307/518* (2013.01); *B32B 2307/72* (2013.01); *B32B 2439/46* (2013.01); *B32B 2439/70* (2013.01)

(58) Field of Classification Search
CPC ......... B32B 27/32; B32B 27/34; B32B 27/36; B32B 27/08; B32B 27/306; B32B 7/12; B32B 15/06; B32B 15/08; B32B 15/12; B32B 15/20; B32B 25/14; B32B 2250/24; B32B 2255/205; B32B 2307/72; B32B 2439/46; B32B 2250/02; B32B 2307/31; B32B 2255/10; B32B 2307/518; B32B 15/00; B32B 2270/00; B32B 2439/70; B32B 2307/732; B32B 27/00
See application file for complete search history.

(56) References Cited

U.S. PATENT DOCUMENTS

| | | | | |
|---|---|---|---|---|
| 5,089,322 A * | 2/1992 | Matsunaga | .......... | C08L 23/0815 428/220 |
| 2004/0191459 A1* | 9/2004 | Driesten | ................... | C09J 11/08 428/42.2 |
| 2012/0202058 A1* | 8/2012 | Takahira | ............ | C08G 18/4202 428/355 EN |

FOREIGN PATENT DOCUMENTS

| | | | |
|---|---|---|---|
| JP | 2009263440 A | * | 11/2009 |
| JP | 2010-36413 A | | 2/2010 |
| JP | 2012-081615 A | | 4/2012 |
| JP | 2015-128894 A | | 7/2015 |

OTHER PUBLICATIONS

Machine Translation, Koda, JP-2009263440-A (Year: 2009).*
International Search Report for PCT/JP2015/079971 dated Jan. 26, 2016.

* cited by examiner

*Primary Examiner* — John D Freeman
(74) *Attorney, Agent, or Firm* — Sughrue Mion, PLLC

(57) ABSTRACT

To provide a laminate excellent in the oil resistance without using a polypropylene film for the innermost layer of a packaging material.
A laminate comprising at least three layers (A), (B) and (C) in this order, wherein the layer (A) is composed of a polyolefin which satisfies the following requirements (a) to (c), the layer (B) is composed of an adhesive which satisfies the following requirements (d) to (f), and the layer (C) is a substrate comprising at least one layer:
(a) density of from 900 to 970 kg/m³,
(b) MFR of from 2 to 30 g/10 min,
(c) film thickness of from 5 to 25 μm,
(d) film thickness of from 0.01 to 3.0 μm,
(e) glass transition temperature of from −30 to +10° C., and
(f) storage modulus E' at 20° C. of from $1.0 \times 10^6$ to $2.5 \times 10^7$ Pa.

16 Claims, No Drawings

LAMINATE AND PACKAGING BODY COMPRISING SAME

CROSS REFERENCE TO RELATED APPLICATIONS

This application is a National Stage of International Application No. PCT/JP2015/079971 filed Oct. 23, 2015, claiming priority based on Japanese Patent Application No. 2014-219398 filed Oct. 28, 2014, the contents of all of which are incorporated herein by reference in their entirety.

TECHNICAL FIELD

The present invention relates to a laminate produced by extrusion coating suitability and capable of production at a low cost, and a package comprising it.

BACKGROUND ART

As a material for packaging of foods, beverages, pharmaceutical products, etc., a multilayer film, having a barrier film made of e.g. polyester or nylon having excellent film strength, and a polyolefin film to be a sealant layer, particularly, polypropylene, high pressure low density polyethylene, ethylene homopolymer, ethylene/vinyl acetate copolymer, via an anchor coating agent, has been widely used.

Such a packaging material is produced mainly by an extrusion coating method, a dry lamination using a solvent type adhesive or a solventless type adhesive. Among them, the extrusion coating method, which provides excellent productivity, is utilized as a method for producing various packaging materials, and a high pressure low density polyethylene (hereinafter referred to as LDPE) excellent in the extrusion coating processability is widely used.

However, in the field of packaging for oily foods such as snack food or instant noodle, LDPE, which has a low oil resistance, has not been utilized. Accordingly, at present, a packaging material composed of a polypropylene film excellent in the oil resistance is used in the oily food packaging field.

Further, in recent years, in the food packaging, easy opening property is sometimes required, however, a laminate obtained by extrusion coating of LDPE by itself, does not exhibit excellent easy opening property. Accordingly, in the oily food packaging, a polypropylene film has been used over a long period of time. However, a polypropylene has poor adhesion to a barrier film when subjected to extrusion coating, and thus cannot be used for extrusion coating, and a method of subjecting a barrier film and a non-oriented polypropylene film to sandwich lamination using LDPE is commonly employed. Accordingly, the packaging material can hardly be made thin.

DISCLOSURE OF INVENTION

Technical Problem

Under these circumstances, it is an object of the present invention to provide a laminate having extrusion coating suitability and capable of production at a low cost, and a package comprising it.

Solution to Problem

The present invention provides the following [1] to [16].

[1] A laminate comprising at least three layers (A), (B) and (C) in this order, wherein the layer (A) is composed of a polyolefin which satisfies the following requirements (a) to (c), the layer (B) is composed of an adhesive which satisfies the following requirements (d) to (f), and the layer (C) is a substrate comprising at least one layer:
 (a) density measured in accordance with JIS K6922-1 of from 900 to 970 kg/m$^3$,
 (b) melt mass flow rate (hereinafter sometimes referred to as MFR) measured in accordance with JIS K6922-1 of from 2 to 30 g/10 min,
 (c) film thickness of from 5 to 25 µm,
 (d) film thickness of from 0.01 to 3.0 µm,
 (e) glass transition temperature measured in accordance with JIS K7121 of from −30 to +10° C., and
 (f) storage modulus E' at 20° C. of from $1.0 \times 10^6$ to $2.5 \times 10^7$ Pa

[2] The laminate according to [1], wherein the layer (A) is a film formed by extrusion coating on the layer (C) via the layer (B).

[3] The laminate according to [1] or [2], wherein the layer (B) is composed of a two component curable polyurethane adhesive comprising a polyol component as a base compound and an isocyanate component as a curing agent.

[4] The laminate according to [3], wherein the isocyanate component is an aliphatic isocyanate.

[5] The laminate according to [3] or [4], wherein the ratio (NCO/OH) of the number of isocyanate groups in the isocyanate component to the number of hydroxy groups (OH) in the polyol component is from 0.5 to 2.5.

[6] The laminate according to any one of [1] to [5], wherein MFR of the polyolefin for the layer (A) measured in accordance with JIS K6922-1 is from 10 to 30 g/10 min.

[7] The laminate according to any one of [1] to [6], wherein the density of the polyolefin for the layer (A) measured in accordance with JIS K6922-1 is from 927 to 942 kg/m$^3$.

[8] The laminate according to any one of [1] to [7], wherein the polyolefin for the layer (A) is a composition comprising from 10 to 90 wt % of a high density polyethylene (1) and/or a copolymer (2) of ethylene and an α-olefin having at least 4 carbon atoms, having a density of less than 940 kg/m$^3$, and from 10 to 90 wt % of a high pressure low density polyethylene (3) (the total amount of (1), (2) and (3) is 100 wt %).

[9] The laminate according to any one of [1] to [7], wherein the polyolefin for the layer (A) is composition comprising from 10 to 70 wt % of a high density polyethylene (1), from 5 to 80 wt % of a copolymer (2) of ethylene and an α-olefin having at least 4 carbon atoms, having a density of less than 940 kg/m$^3$, and from 10 to 85 wt % of a high pressure low density polyethylene (3) (the total amount of (1), (2) and (3) is 100 wt %).

[10] The laminate according to any one of [1] to [9], wherein the substrate as the layer (C) is a film of at least one member selected from the group consisting of a polyester, a polyamide, a polypropylene, a saponified ethylene/vinyl acetate copolymer and a polyvinyl alcohol.

[11] The laminate according to any one of [1] to [10], wherein the substrate as the layer (C) is at least one vapor-deposited film having a vapor-deposited thin layer composed of a metal or metal oxide of aluminum, alumina or silica.

[12] The laminate according to any one of [1] to [11], wherein the substrate as the layer (C) is a biaxially oriented polyester film or polyamide film having an aluminum vapor-deposited layer.

[13] The laminate according to any one of [1] to [12], wherein when a press-formed product (150 mm×150 mm×1 mm) of the polyolefin for the layer (A) is immersed in edible oil at 60° C. for 24 hours, the weight change is at most 1.2%.

[14] A package comprising the laminate as defined in any one of [1] to [13].

[15] The package according to [14], wherein the opening strength of a pillow bag obtained by heat-sealing the layer (A) each other by a heat sealer at form 125° C. to 140° C., is from 5 to 25N.

[16] The package according to [14] or [15], which is for packaging a fat-and-oil component-containing content.

Now, the present invention will be described in detail.

The polyolefin constituting the layer (A) in the present invention means a homopolymer or copolymer of a $C_{2-12}$ α-olefin such as ethylene, propylene or 1-butene, or a copolymer of ethylene and a vinyl ester, an acrylate or acrylic acid. It may, for example, be an ethylene polymer such as a high pressure low density polyethylene, a high density polyethylene, a medium density polyethylene, an ethylene/1-butene copolymer, an ethylene/1-hexene copolymer, an ethylene/1-octene copolymer, an ethylene/4-methyl-1-pentene copolymer, an ethylene/vinyl acetate copolymer, an ethylene/acrylic acid copolymer, an ethylene/methacrylic acid copolymer, an ethylene/acrylate copolymer or an ethylene/methacrylate copolymer, a polypropylene, a propylene/ethylene copolymer, a propylene/1-butene copolymer, poly(1-butene), poly(1-hexene) or poly(4-methyl-1-pentene), and the polyolefin may be used alone or in combination of two or more. Among them, from the viewpoint of the adhesion to the layer (B), an ethylene homopolymer, an ethylene/α-olefin copolymer or a high pressure low density polyethylene is preferred, and a composition thereof is most preferred in view of excellent extrusion coating processability.

As a preferred blend ratio of the composition, from the viewpoint of easy opening property and extrusion coating processability, preferred is composition comprising from 10 to 90 wt % of a high density polyethylene (1) and/or a copolymer of ethylene and an α-olefin having at least 4 carbon atoms, having a density of less than 940 kg/m³, and from 10 to 90 wt % of a high pressure low density polyethylene (3) (the total amount of (1), (2) and (3) is 100 wt %), more preferred is composition comprising from 20 to 80 wt % of a high density polyethylene (1) and/or a copolymer (2) of ethylene and an α-olefin having at least 4 carbon atoms, having a density of less than 940 kg/m³, and from 20 to 80 wt % of a high pressure low density polyethylene (3) (the total amount of (1), (2) and (3) is 100 wt %), and most preferred is composition comprising from 20 to 50 wt % of a high density polyethylene (1) and/or a copolymer (2) of ethylene and an α-olefin having at least 4 carbon atoms, having a density of less than 940 kg/m³, and from 50 to 80 wt % of a high pressure low density polyethylene (the total amount of (1), (2) and (3) is 100 wt %).

As a more preferred blend ratio of the composition, from the viewpoint of easy opening property and extrusion coating processability, preferred is composition comprising from 10 to 70 wt % of a high density polyethylene (1), from 5 to 80 wt % of a copolymer (2) of ethylene and an α-olefin having at least 4 carbon atoms, having a density of less than 940 kg/m³, and from 10 to 85 wt % of a high pressure low density polyethylene (3) (the total amount of (1), (2) and (3) is 100 wt %), more preferred is composition comprising from 15 to 50 wt % of a high density polyethylene (1), from 5 to 65 wt % of a copolymer (2) of ethylene and an α-olefin having at least 4 carbon atoms, having a density of less than 940 kg/m³, and from 20 to 80 wt % of a high pressure low density polyethylene (3) (the total amount of (1), (2) and (3) is 100 wt %), and most preferred is composition comprising from 15 to 40 wt % of a high density polyethylene (1), from 5 to 35 wt % of a copolymer (2) of ethylene and an α-olefin having at least 4 carbon atoms, having a density of less than 940 kg/m³, and from 50 to 80 wt % of a high pressure low density polyethylene (3) (the total amount of (1), (2) and (3) is 100 wt %).

A method for producing such a high density polyethylene and a copolymer of ethylene and an α-olefin having at least 4 carbon atoms, having a density of less than 940 kg/m³, is not particularly limited, and a high/medium/low pressure ionic polymerization method using a Ziegler-Matta catalyst, a Phillips catalyst or a metallocene catalyst may, for example, be mentioned, and such a resin may properly be selected from among commercial products. For example, Nipolon Hard, Nipolon-L and Nipolon-Z, tradenames, are commercially available from Tosoh Corporation. Further, as a method for producing a high pressure low density polyethylene, a high pressure radical polymerization may, for example, be mentioned, and such a resin may be properly selected from among commercial products, and for example, Petrothene, tradename, is commercially available from Tosoh Corporation.

The polyolefin constituting the layer (A) of the present invention has density measured in accordance with JIS K6922-1 (1997) of from 900 to 970 kg/m³, preferably from 910 to 950 kg/m³, more preferably from 917 to 942 kg/m³, most preferably from 927 to 942 kg/m³. If the density is less than 900 kg/m³, the easy opening property tends to be inferior. On the other hand, if the density exceeds 970 kg/m³, the adhesion to the layer (C) tends to be inferior.

Further, such a polyolefin has MFR measured in accordance with JIS K6922-1 (1997) of from 2 to 30 g/10 min, preferably from 5 to 30 g/10 min, more preferably from 10 to 30 g/10 min. If MFR is less than 2 g/10 min, the easy opening property tends to be inferior, and if it exceeds 30 g/10 min, the extrusion coating processability tends to be inferior.

Further, the polyolefin constituting the layer (A) of the present invention may contain, as the case requires, an additive commonly used for a polyolefin, such as an antioxidant, a lubricant, a neutralizing agent, a blocking inhibitor, a surfactant or a slipping agent, or a thermoplastic resin such as another polyolefin.

The composition of the polyolefin constituting the layer (A) of the present invention may be produced by a conventional mixing apparatus for a resin. For example, a melt-kneading apparatus such as a single screw extruder, a twin screw extruder, a Bunbary mixer, a pressure kneader or a revolving roll, a Henschel mixer, a V blender, a ribbon blender or a tumbler may, for example, be mentioned. In a case where a melt-kneading apparatus is used, the melt temperature is preferably from the melting point of the polyolefin to about 350° C.

Further, the weight change after a formed product (about 20 g) by press-forming the polyolefin constituting the layer (A) of the present invention in a size of 150 mm×150 mm×1 mm is immersed in edible oil (salad oil) at 60° C. for 24 hours, is preferably at most 1.2%, whereby delamination by edible oil contained in an object to be packaged will hardly occur.

The adhesive constituting the layer (B) of the present invention has glass transition temperature measured in accordance with JIS K7121 of from −30 to +10° C., preferably from −25 to +5° C., more preferably from −20 to −5°

C., most preferably from −20 to 0° C. If the glass transition temperature is less than −30° C., the bag ruptured strength tends to be low, and if it exceeds +10° C., the opening appearance tends to be poor.

Of the adhesive constituting the layer (B) of the present invention, storage modulus E' at 20° C. at a frequency of 10 Hz is from $1.0 \times 10^6$ to $2.5 \times 10^7$ Pa, preferably from $4.0 \times 10^6$ to $2.0 \times 10^7$, more preferably from $8.0 \times 10^6$ to $2.0 \times 10^7$, most preferably from $8.0 \times 10^6$ to $1.5 \times 10^7$. If the storage modulus is less than $1.0 \times 10^6$ Pa, the bag ruptured strength tends to be low, and if it exceeds $2.5 \times 10^7$ Pa, the opening appearance tends to be poor.

A compound constituting such an adhesive is not particularly limited so long as it has a glass transition temperature and the storage modulus within the above ranges, and may, for example, be a polyurethane adhesive, a polyisocyanate adhesive, a polyurea adhesive, an epoxy adhesive, an acrylic adhesive, a polyamide adhesive or a polybutadiene adhesive, and is preferably a polyurethane adhesive, of which the adhesion and the storage modulus can readily be controlled.

As the polyurethane adhesive, preferred is a two component curable polyurethane adhesive comprising a polyol component as a base compound and an isocyanate component as a curing agent. Such a polyurethane adhesive is composed of a polyol component having at least two hydroxy groups in its molecule and an isocyanate component having at least two isocyanate groups in its molecule. The polyol component may, for example, be a polyurethane polyol, a polyester polyol, a polyether polyol, an acrylic polyol or a polyolefin polyol, and such polyol components may be used as a mixture of two or more. Among them, preferred is a polyurethane polyol, a polyester polyol or a polyether polyol, of which the glass transition temperature and the storage modulus can readily be controlled. Further, it is preferred that at least 30 wt % of the dicarboxylic acid component, the diol component and the diester component, constituting the polyurethane polyol or the polyester polyol, is an aliphatic component, whereby the glass transition temperature and the storage modulus are low, and the opening appearance tends to improve.

On the other hand, as the isocyanate component, an aromatic aliphatic diisocyanate, an aliphatic diisocyanate or an alicyclic diisocyanate may, for example, be mentioned. The aromatic aliphatic diisocyanate may, for example, be specifically 1,3- or 1,4-xylylene diisocyanate or a mixture thereof, 1,3- or 1,4-bis(1-isocyanato-1-methylethyl)benzene or a mixture thereof, or ω,ω'-diisocyanate-1,4-diethylbenzene. The aliphatic diisocyanate may, for example, be specifically hexamethylene diisocyanate, tetramethylene diisocyanate, 2-methyl-pentane-1,5-diisocyanate, 3-methyl-pentane-1,5-diisocyanate, lysine diisocyanate or trioxyethylene diisocyanate. The alicyclic diisocyanate may, for example, be specifically isophorone diisocyanate, cyclohexyl diisocyanate, hydrogenated diphenylmethane diisocyanate, norbornane diisocyanate, hydrogenated tolylene diisocyanate, hydrogenated xylene diisocyanate or hydrogenated tetramethylxylene diisocyanate.

Further, as the isocyanate component, a polymeric compound of the diisocyanate, such as biuret, dimer, trimer, dimer/trimer or uretonimine-modified product, or an organic polyisocyanate modified product such as an adduct of a polyisocyanate obtained by the reaction of a bifunctional or higher polyol or the like and the diisocyanate or a polymeric compound thereof.

They may be used alone or as a mixture of two or more.

Among them, an aliphatic isocyanate modified product and/or an alicyclic isocyanate modified product is preferred, and an aliphatic isocyanate modified product is more preferred, whereby the glass transition temperature and the storage modulus tend to be low, and the opening appearance will improve.

Such a polyurethane adhesive may be properly selected from among commercial products, for example, NIPPOLLAN and CORONATE, tradenames, manufactured by Tosoh Corporation.

The glass transition temperature and the storage modulus may be adjusted by the selection of the polyol component and the isocyanate component and by the blend ratio of the polyol component and the isocyanate component. Further, the ratio (NCO/OH) of the number of isocyanate groups of the isocyanate component to the number of hydroxy groups of the polyol component constituting the polyurethane adhesive is preferably within a range of from 0.5 to 2.5, whereby excellent easy opening property, particularly opening appearance is achieved, and is more preferably from 0.7 to 2.0, most preferably from 0.8 to 1.6.

The thickness of the polyurethane adhesive (B) is preferably within a range of from 0.01 to 3 μm, whereby excellent adhesion and easy opening property are achieved, more preferably from 0.1 to 1 μm, further preferably from 0.1 to 0.7 μm.

A solvent used to dilute the adhesive is not particularly limited, and may, for example, be an ester such as ethyl acetate, butyl acetate or cellosolve acetate, a ketone such as acetone, methyl ethyl ketone, isobutyl ketone or cyclohexanone, an ether such as tetrahydrofuran or dioxane, an aromatic hydrocarbon such as toluene or xylene, a halogenated hydrocarbon such as methylene chloride or ethylene chloride, dimethylsulfoxide, dimethylsulfamide, an alcohol such as methanol, ethanol or isopropanol, or water.

Such an adhesive may be applied to the substrate as the layer (C) by a coater attached to a known laminator or extrusion coating machine. Particularly, a plain roll is preferred, whereby excellent application accuracy is achieved when the urethane adhesive is thin.

The substrate constituting the layer (C) of the present invention is not particularly limited and may, for example, be a film composed of a high molecular weight polymer such as a polyester such as polyethylene terephthalate or polybutylene terephthalate, a polyamide such as nylon 6 or nylon 66, a saponified ethylene/vinyl acetate copolymer, a polyvinyl alcohol, a polypropylene, an acrylic resin, polymethylpentene, polyvinyl chloride, polyvinylidene chloride, polycarbonate or a cellulose resin, or cellophane, and is preferably a film of at least one member selected from the group consisting of a polyester, a polyamide, a polypropylene, a saponified ethylene/vinyl acetate copolymer and a polyvinyl alcohol. Among these films, a polyester film is preferred, which is excellent in the heat resistance.

Further, such a film may further be subjected to aluminum vapor deposition, alumina vapor deposition, silicon dioxide vapor deposition or acrylic treatment, and is preferably a film having a vapor-deposited thin layer composed of a metal or metal oxide of aluminum, alumina or silica.

Further, among them, the layer (C) is preferably a biaxially oriented polyester film or polyamide film having a layer selected from the group consisting of an aluminum vapor-deposited layer, an alumina vapor-deposited layer, a silicon dioxide vapor-deposited layer and an acrylic-treatment layer, in view of excellent adhesion to the polyolefin film (A), light blocking property and barrier property.

Further, in order that the layer (C) has improved adhesion to the layer (B), the surface to be in contact with the layer (B) of the layer (C) is preferably subjected to a known surface treatment such as a corona treatment, a flame treatment or a plasma treatment.

The laminate of the present invention comprises at least three layers in order of the layer (A), the layer (B) and the layer (C). Further, it may have another component, such as a layer (D). Specifically, a constitution layer (A)/layer (B)/layer (C)/layer (D) or layer (D)/layer (A)/layer (B)/layer (C) may, for example, be mentioned. The material of the layer (D) is not particularly limited and may, for example, be a polyolefin such as polyethylene or polypropylene, a polyester such as polyethylene terephthalate or polybutylene terephthalate, a polyamide, a saponified ethylene/vinyl acetate copolymer, a polyvinyl alcohol, an acrylic resin, polymethylpentene, polyvinyl chloride, polyvinylidene chloride, polystyrene, polycarbonate, polyurethane or a cellulose resin.

The laminate of the present invention may be prepared by a known lamination method. As a means to obtain an easily openable packaging material of the present invention, a lamination method of thereto-compression bonding the layer (A) composed of a resin composition (A) for coating, formed by press-forming or extrusion, and a formed product of the layer (B) composed of the adhesive (B) and the layer (C), is preferred. The lamination method may, for example, be extrusion coating, sandwich lamination, dry lamination using a solvent type adhesive, dry lamination using a solventless type adhesive, wet lamination or thermal lamination, and is preferably extrusion coating from the viewpoint of the cost and the thin film forming property.

In order to achieve favorable adhesion when subjected to extrusion coating, at least the surface to be in contact with the adhesive (B) of a molten film composed of the polyolefin extruded from a die, is preferably oxidized by the air or an ozone gas. In order that the oxidation reaction proceeds by the air, the temperature of the polyolefin film (A) of the present invention extruded from a die is preferably at least 290° C., and in order that the oxidation reaction proceeds by an ozone gas, the temperature of the polyolefin film (A) of the present invention extruded from a die is preferably at least 200° C. Further, the amount of the ozone gas for treatment is preferably at least 0.5 mg per 1 m$^2$ of the film composed of the polyolefin of the present invention extruded from a die.

The film thickness of the layer (A) composed of the polyolefin is from 5 to 25 μm, preferably from 10 to 25 μm, more preferably from 13 to 22 μm. If the film thickness of the layer (A) composed of the polyolefin is less than 5 μm, the adhesion to the layer (C) and the oil resistance tend to be inferior, and if it exceeds 25 μm, not only the economical efficiency is deteriorated but also the peel appearance when the sealing portion of a resulting package is opened tends to be deteriorated.

The laminate of the present invention is excellent in easy opening property, and the adhesion to the layer (C) is high, whereby the laminate of the present invention is used as an easily openable packaging material in various fields, and it is used as a package by welding the layer (A) each other.

Of a pillow bag obtained by heat-sealing the layer (A) of the laminate of the present invention each other by a heat sealer at from 125° C. to 140° C., the opening strength is preferably from 5 to 25N, more preferably from 8 to 20N. When the opening strength of the package is at least 5N, the package can sufficiently protects the content as a packaging material, and when the opening strength is at most 25N, the opening strength is not too strong, and excellent easy opening property is achieved.

Advantageous Effects of Invention

The package of the present invention, which is excellent in the oil resistance, is particularly suitable as a package of a fat-and-oil component-containing content such as snack food or instant noodle.

EXAMPLES

Now, the present invention will be described in further detail with reference to Examples. However, it should be understood that the present invention is by no means restricted to such specific Examples.

(1) Melt Mass Flow Rate (MFR)

It was measured in accordance with JIS K6922-1 (1997).

(2) Density

It was measured in accordance with JIS K6922-1 (1997).

(3) Glass Transition Temperature

The glass transition temperature was measured by using DSC200 manufactured by Seiko Instruments & Electronics Ltd. in a nitrogen stream. That is, using 10 mg of a cured product of a two component curable polyurethane adhesive, DSC measurement was carried out at a temperature-increasing rate of 10° C./min from −100° C. to 100° C. to determine the glass transition temperature.

(4) Storage Modulus

The storage modulus was measured by using Rheogel E4000 manufactured by UBM at a tensile mode. The storage modulus was determined by measurement within a range of from −100 to 200° C. at a frequency of 10 Hz.

(5) Opening Strength/Peel Appearance

Top and bottom portions of a laminate comprising three layers in order of layer (A)/layer (B)/layer (C) obtained in Example were heat-sealed by using hot tack tester manufactured by TESTER SANGYO CO., LTD., at a sealing temperature of 140° C. under a sealing pressure of 0.2 MPa for a sealing time of 1 second to prepare a 100 cm$^2$ pillow bag, and the pillow bag was opened by using a tensile tester (manufactured by ORIENTEC CORPORATION, TENSILON RTE-1210) at a rate of pulling of 300 mm/min, and the opening strength was measured.

Further, as the peel appearance, whether the laminate was broken or not was confirmed. A case where the layer (A) film was separated was also rated as appearance failure (x).

(6) Oil Resistance

About 20 g of pellets were press-formed by using a 50 t automatic pressing machine manufactured by SHINTO Metal Industries Corporation. The size of the formed product was 150 mm×150 mm×1 mm. The obtained formed product was immersed in salad oil (tradename: Nisshin Salad oil) at 60° C. for 24 hours, and a weight change between before and after immersion was examined.

(7) Extrusion Coating Processability

Whether processing failure such as web tearing or significant change of web width did not occur in extrusion coating and a stable coated film was obtained, or not, was confirmed.

(8) Bag Ruptured Strength

Top and bottom portions of a laminate comprising three layers in order of layer (A), layer (B) and layer (C) obtained in Example were heat-sealed by using hot tack tester manufactured by TESTER SANGYO CO., LTD., at a sealing temperature of 140° C. under a sealing pressure of 0.2 MPa for a sealing time of 1 second to prepare a 100 cm$^2$ pillow bag, and the air was injected (0.75 L/min) into the pillow bag by an injection needle, and the maximum pressure at the time when the bag was ruptured was measured. The measurement method was in accordance with JIS Z0238.

(9) Opening Appearance (%)

Top and bottom portions of a laminate comprising three layers in order of layer (A), layer (B) and layer (C) obtained in Example were heat-sealed by using hot tack tester manufactured by TESTER SANGYO CO., LTD., at a sealing temperature of 140° C. under a sealing pressure of 0.2 MPa for a sealing time of 1 second to prepare a 100 cm² pillow bag. The sealing portion of the pillow bag was opened by hands, and the ratio of the area where the sealing portion peeled/the entire area of the sealing portion×100=opening appearance (%) was examined.

Now, the present invention will be described in further detail with reference to Examples. However, it should be understood that the present invention is by no means restricted to such specific Examples.

Example for Production of Polyolefin (A-1) for Layer (A)

As a polyolefin (A-1) for the layer (A), a high density polyethylene (manufactured by Tosoh Corporation, tradename: Nipolon Hard 1000) having melt mass flow rate of 20 g/10 min and density of 964 kg/m³ and a high pressure low density polyethylene (manufactured by Tosoh Corporation, tradename: Petrothene 205) having melt flow rate of 3 g/10 min and density of 924 kg/m³ were dry-blended in a weight ratio of 80/20 and extruded into strands by a single screw extruder (manufactured by Placo Co., Ltd.) equipped with a screw of 50 mm in diameter and a strand die at a set temperature of 180° C. with an output rate of 25 kg/hour, and the strands were pelletized by using a strand cutter (manufactured by SEIWA IRONWORKS CO., LTD.). Of the polyolefin (A-1), MFR, the density and the oil resistance were evaluated. The results are shown in Table 1.

Example for Production of Polyolefin (A-2) for Layer (A)

A polyolefin (A-2) for the layer (A) was produced in the same manner as in Example for production of (A-1) except that a high density polyethylene (manufactured by Tosoh Corporation, tradename: Nipolon Hard 1000) having melt mass flow rate of 20 g/10 min and density of 964 kg/m³ and a high pressure low density polyethylene (manufactured by Tosoh Corporation, tradename: Petrothene 205) having melt mass flow rate of 3 g/10 min and density of 924 kg/m³ were dry-blended in a weight ratio of 22/78. Of the polyolefin (A-2), MFR, the density and the oil resistance were evaluated. The results are shown in Table 1.

Example for Production of Polyolefin (A-3) for Layer (A)

A polyolefin (A-3) for the layer (A) was produced in the same manner as in Example for production of (A-1) except that a high density polyethylene (manufactured by Tosoh Corporation, tradename: Nipolon Hard 1000) having melt mass flow rate of 20 g/10 min and density of 964 kg/m³, a high pressure low density polyethylene (manufactured by Tosoh Corporation, tradename: Petrothene 202) having melt mass flow rate of 24 g/10 min, and density of 918 kg/m³ and a high pressure low density polyethylene (manufactured by Tosoh Corporation, tradename: Petrothene 205) having melt mass flow rate of 3 g/10 min and density of 924 kg/m³ were dry-blended in a weight ratio of 25/55/20. Of the polyolefin (A-3), MFR, the density and the oil resistance were evaluated. The results are shown in Table 1.

Example for Production of Polyolefin (A-4) for Layer (A)

A polyolefin (A-4) for the layer (A) was produced in the same manner as in Example for production of (A-1) except that a high density polyethylene (manufactured by Tosoh Corporation, tradename: Nipolon Hard 1000) having melt mass flow rate of 20 g/10 min and density of 964 kg/m³, an ethylene/1-hexene copolymer (manufactured by Tosoh Corporation, tradename: Nipolon-L M80) having melt mass flow rate of 50 g/10 min and density of 930 kg/m³ and a high pressure low density polyethylene (manufactured by Tosoh Corporation, tradename: Petrothene 205) having melt mass flow rate of 3 g/10 min and density of 924 kg/m³ were dry-blended in a weight ratio of 10/80/10. Of the polyolefin (A-4), MFR, the density and the oil resistance were evaluated. The results are shown in Table 1.

Example for Production of Polyolefin (A-5) for Layer (A)

A resin composition (A-5) for coating for the layer (A) was produced in the same manner as in Example for production of (A-1) except that a high density polyethylene (manufactured by Tosoh Corporation, tradename: Nipolon Hard 1000) having melt mass flow rate of 20 g/10 min and density of 964 kg/m³, an ethylene/1-hexene copolymer (manufactured by Tosoh Corporation, tradename: Nipolon Z ZF260) having melt mass flow rate of 2 g/10 min and density of 936 kg/m³, a high pressure low density polyethylene (manufactured by Tosoh Corporation, tradename: Petrothene 202) having melt mass flow rate of 24 g/10 min and density of 918 kg/m³ and a high pressure low density polyethylene (manufactured by Tosoh Corporation, tradename: Petrothene 205) having melt mass flow rate of 3 g/10 min and density of 924 kg/m³ were dry-blended in a weight ratio of 25/10/45/20. Of the resin composition (A-5) for coating, MFR, the density and the oil resistance were evaluated. The results are shown in Table 1.

Example for Production of Polyolefin (A-6) for Layer (A)

A resin composition (A-6) for coating for the layer (A) was produced in the same manner as in Example for production of (A-1) except that a high density polyethylene (manufactured by Tosoh Corporation, tradename: Nipolon Hard 1000) having melt mass flow rate of 20 g/10 min and density of 964 kg/m³, an ethylene/1-hexene copolymer (manufactured by Tosoh Corporation, tradename: Nipolon Z ZF260) having melt mass flow rate of 2 g/10 min and density of 936 kg/m³, a high pressure low density polyethylene (manufactured by Tosoh Corporation, tradename: Petrothene 249) having melt mass flow rate of 70 g/10 min and density of 916 kg/m³ and a high pressure low density polyethylene (manufactured by Tosoh Corporation, tradename: Petrothene 205) having melt mass flow rate of 3 g/10 min and density of 924 kg/m³ were dry-blended in a weight ratio of 30/10/40/20. Of the resin composition (A-6) for coating, MFR, the density and the oil resistance were evaluated. The results are shown in Table 1.

TABLE 1

|  |  | (A-1) | (A-2) | (A-3) | (A-4) | (A-5) | (A-6) |
| --- | --- | --- | --- | --- | --- | --- | --- |
| High density polyethylene | MFR (g/10 min) | 20 | 20 | 20 | 20 | 20 | 20 |
|  | Density (kg/m³) | 964 | 964 | 964 | 964 | 964 | 964 |
|  | Blend ratio (wt %) | 80 | 22 | 25 | 10 | 25 | 30 |
| Copolymer of ethylene and α-olefin having at least 4 carbon atoms | MFR (g/10 min) | — | — | — | 50 | 2 | 2 |
|  | Density (kg/m³) | — | — | — | 930 | 936 | 936 |
|  | Blend ratio (wt %) | — | — | — | 80 | 10 | 10 |

TABLE 1-continued

|  |  | (A-1) | (A-2) | (A-3) | (A-4) | (A-5) | (A-6) |
|---|---|---|---|---|---|---|---|
| High pressure low density polyethylene | MFR (g/10 min) | 3 | 3 | 24 | 3 | 24 | 70 |
|  | Density (kg/m$^3$) | 924 | 924 | 918 | 924 | 918 | 916 |
|  | Blend ratio (wt %) | 20 | 78 | 55 | 10 | 45 | 40 |
|  | MFR (g/10 min) | — | — | 3 | — | 3 | 3 |
|  | Density (kg/m$^3$) | — | — | 924 | — | 924 | 924 |
|  | Blend ratio (wt %) | — | — | 20 | — | 20 | 20 |
| Polyolefin (A) | MFR (g/10 min) | 14 | 5 | 15 | 34 | 12 | 18 |
|  | Density (kg/m$^3$) | 956 | 933 | 931 | 933 | 933 | 934 |
|  | Oil resistance (%) | 0.5 | 0.9 | 1.0 | 1.1 | 0.9 | 0.9 |

Example 1

As the polyolefin (A), a high pressure low density polyethylene (manufactured by Tosoh Corporation, tradename: Petrothene 203) having melt mass flow rate of 8 g/10 min and density of 919 kg/m$^3$ was supplied to an extrusion coating machine (manufactured by Musashino Kikai Co., Ltd.) having a screw of 90 mm in diameter, extruded from a T die having an opening width of 600 mm at a temperature of 320° C. at a substrate withdrawal rate of 100 m/min, and extrusion-coated so that a polyolefin film (A) had a thickness of 15 μm, on a corona-treated surface on which an adhesive blended in the following ratio as an adhesive layer had been applied and the solvent had been dried, of a biaxially oriented polyester film (manufactured by TOYOBO CO., LTD., tradename: TOYOBO ESTER Film E-5100, thickness: 25 μm, hereinafter sometimes referred to as PET) fed from unwinder, as the layer (C), to obtain a laminate film. Using the laminate film, the opening strength, the peel appearance and the extrusion coating processability were evaluated. The results are shown in Table 2.

Adhesive:

A polyester-based polyurethane resin (manufactured by Tosoh Corporation, tradename: NIPPOLLAN 3228) and a polyisocyanate (manufactured by Tosoh Corporation, tradename: CORONATE HL) were mixed in a weight ratio of 100/5 and diluted with ethyl acetate so that the solid content concentration would be 7%.

Example 2

A laminate film was prepared in the same manner as in Example 1 except that the polyolefin (A-1) was used as the polyolefin (A) and the thickness of the layer (A) was 20 μm, and physical properties of the obtained laminate film were evaluated. The results are shown in Table 2.

Example 3

A laminate film was prepared in the same manner as in Example 1 except that the polyolefin (A-2) was used as the polyolefin (A) and the thickness of the layer (A) was 20 μm, and physical properties of the obtained laminate film were evaluated. The results are shown in Table 2.

Example 4

A laminate film was prepared in the same manner as in Example 3 except that an adhesive blended in the following ratio was used as the adhesive, and physical properties of the obtained laminate film were evaluated. The results are shown in Table 2.

Adhesive:

A polyester-based polyurethane resin (manufactured by Tosoh Corporation, tradename: NIPPOLLAN 3228) and a polyisocyanate (manufactured by Tosoh Corporation, tradename: CORONATE HL) were mixed in a weight ratio of 100/5 and diluted with ethyl acetate so that the solid content concentration would be 12%.

Example 5

A laminate film was prepared in the same manner as in Example 1 except that the polyolefin (A-3) was used as the polyolefin (A) and the thickness of the layer (A) was 20 μm, and physical properties of the obtained laminate film were evaluated. The results are shown in Table 2.

Example 6

A laminate film was prepared in the same manner as in Example 5 except that the thickness of the layer (A) was 15 μm, and physical properties of the obtained laminate film were evaluated. The results are shown in Table 2.

Example 7

A laminate film was prepared in the same manner as in Example 5 except that an adhesive blended in the following ratio was used as the adhesive, and physical properties of the obtained laminate film were evaluated. The results are shown in Table 2.

Adhesive:

A polyester-based polyurethane resin (manufactured by Tosoh Corporation, tradename: NIPPOLLAN 3228) and a polyisocyanate (manufactured by Tosoh Corporation, tradename: CORONATE HL) were mixed in a weight ratio of 100/3 and diluted with ethyl acetate so that the solid content concentration would be 7%.

Example 8

A laminate film was prepared in the same manner as in Example 5 except that an adhesive blended in the following ratio was used as the adhesive, and physical properties of the obtained laminate film were evaluated. The results are shown in Table 2.

Adhesive:

A polyester-based polyurethane resin (manufactured by Tosoh Corporation, tradename: NIPPOLLAN 3228) and a polyisocyanate (manufactured by Tosoh Corporation, tradename: CORONATE HL) were mixed in a weight ratio of 100/10 and diluted with ethyl acetate so that the solid content concentration would be 7%.

Example 9

A laminate film was prepared in the same manner as in Example 5 except that as the layer (C), an aluminum vapor-deposited polyester film (manufactured by Reiko Co., Ltd., tradename: DIALUSTER ST, thickness: 12 μm, hereinafter sometimes referred to as VM-PET) fed from the first paper feeding part was used, and physical properties of the obtained laminate film were evaluated. The results are shown in Table 2.

Example 10

A laminate film was prepared in the same manner as in Example 5 except that as the layer (C), a nylon film (manufactured by TOYOBO CO., LTD. tradename: TOYOBO HARDEN Film N-1100, thickness: 25 μm, hereinafter sometimes referred to as Ny) fed from the first paper feeding part was used, and physical properties of the obtained laminate film were evaluated. The results are shown in Table 2.

Example 11

A laminate film was prepared in the same manner as in Example 1 except that the polyolefin (A-5) was used and the thickness of the layer (A) was 20 μm, and physical properties of the obtained laminate film were evaluated. The results are shown in Table 2.

Example 12

A laminate film was prepared in the same manner as in Example 1 except that the polyolefin (A-6) was used and the thickness of the layer (A) was 20 μm, and physical properties of the obtained laminate film were evaluated. The results are shown in Table 2.

Example 13

A laminate film was prepared in the same manner as in Example 5 except that an adhesive blended in the following ratio was used as the adhesive and the thickness of the layer (A) was 15 μm, and physical properties of the obtained laminate film were evaluated. The results are shown in Table 2.

Adhesive:
A polyester-based polyurethane resin (manufactured by Tosoh Corporation, tradename: NIPPOLLAN 3228) and a polyisocyanate (manufactured by Tosoh Corporation, tradename: CORONATE L) were mixed in a weight ratio of 100/5 and diluted with ethyl acetate so that the solid content concentration would be 7%.

Example 14

A laminate film was prepared in the same manner as in Example 5 except that an adhesive blended in the following ratio was used as the adhesive and the thickness of the layer (A) was 15 μm, and physical properties of the obtained laminate film were evaluated. The results are shown in Table 2.

Adhesive:
A polyester-based polyurethane resin (manufactured by Tosoh Corporation, tradename: NIPPOLLAN 3228) and a polyisocyanate (manufactured by Tosoh Corporation, tradename: CORONATE L) were mixed in a weight ratio of 100/8 and diluted with ethyl acetate so that the solid content concentration would be 7%.

Example 15

A laminate film was prepared in the same manner as in Example 5 except that the polyolefin (A-3) was used, the thickness of the layer (A) was 20 μm, and an adhesive blended in the following ratio was used as the adhesive, and physical properties of the obtained laminate film were evaluated. The results are shown in Table 2.

Adhesive:
A polybutadiene adhesive (Dainichiseika Color & Chemicals Mfg., Co., Ltd., tradename: SEIKADYNE 4300A) was diluted with methanol and water so that the solid content concentration would be 1%.

Example 16

A laminate film was prepared in the same manner as in Example 15 except that as the polyolefin (A), a high pressure low density polyethylene (manufactured by Tosoh Corporation, tradename: Petrothene 203) having melt mass flow rate of 8 g/10 min and density of 919 kg/m³ was used, and the thickness of the layer (A) was 15 μm, and physical properties of the obtained laminate film were evaluated. The results are shown in Table 2.

TABLE 2

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Layer (A) | Type | Petrothene 203 | (A-1) | (A-2) | (A-2) | (A-3) | (A-3) | (A-3) | (A-3) |
| | MFR (g/10 min) | 8 | 14 | 5 | 5 | 15 | 15 | 15 | 15 |
| | Density (kg/m³) | 919 | 956 | 933 | 933 | 931 | 931 | 931 | 931 |
| | Thickness (μm) | 15 | 20 | 20 | 20 | 20 | 15 | 20 | 20 |
| | Oil resistance (%) | 6.4 | 0.5 | 0.9 | 0.9 | 1.0 | 1.0 | 1.0 | 1.0 |
| Layer (B) | Base compound/ curing agent | 100/5 | 100/5 | 100/5 | 100/5 | 100/5 | 100/5 | 100/3 | 100/10 |
| | Thickness (μm) | 0.5 | 0.5 | 0.5 | 1.0 | 0.5 | 0.5 | 0.5 | 0.5 |
| | Glass transition temperature (° C.) | −15 | −15 | −15 | −15 | −15 | −15 | −15 | −10 |
| | Storage modulus (Pa) | $1.1 \times 10^7$ | $1.1 \times 10^7$ | $1.1 \times 10^7$ | $1.1 \times 10^7$ | $1.1 \times 10^7$ | $1.1 \times 10^7$ | $9.2 \times 10^6$ | $1.9 \times 10^7$ |
| | NCO/OH | 1.0 | 1.0 | 1.0 | 1.0 | 1.0 | 1.0 | 0.6 | 2.0 |
| Layer (C) | Type | PET | PET | PET | PET | PET | PET | PET | PET |
| Laminate | Forming property | ○ | ○ | ○ | ○ | ○ | ○ | ○ | ○ |
| | Tear strength (N) | 19 | 8 | 17 | 18 | 15 | 12 | 13 | 31 |
| | Peel appearance | ○ | Δ | Δ | Δ | ○ | ○ | ○ | Δ |
| | Bag ruptured strength (kPa) | 20 | 30 | 27 | 27 | 28 | 23 | 26 | 30 |
| | Opening appearance (%) | 95 | 75 | 60 | 60 | 100 | 100 | 100 | 75 |

TABLE 2-continued

|  |  | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Layer (A) | Type | (A-3) | (A-3) | (A-5) | (A-6) | (A-3) | (A-3) | (A-3) | Petrothene 203 |
|  | MFR (g/10 min) | 15 | 15 | 12 | 18 | 15 | 15 | 15 | 8 |
|  | Density (kg/m$^3$) | 931 | 931 | 933 | 934 | 931 | 931 | 931 | 919 |
|  | Thickness (μm) | 20 | 20 | 20 | 20 | 15 | 15 | 20 | 15 |
|  | Oil resistance (%) | 1.0 | 1.0 | 0.9 | 0.9 | 1.0 | 1.0 | 1.0 | 6.4 |
| Layer (B) | Base compound/ curing agent | 100/5 | 100/5 | 100/5 | 100/5 | 100/5 | 100/8 | — | — |
|  | Thickness (μm) | 0.5 | 0.5 | 0.5 | 0.5 | 0.5 | 0.5 | 0.05 | 0.05 |
|  | Glass transition temperature (° C.) | −15 | −15 | −15 | −15 | −5 | 0.5 | — | — |
|  | Storage modulus (Pa) | $1.1 \times 10^7$ | $1.1 \times 10^7$ | $1.1 \times 10^7$ | $1.1 \times 10^7$ | $1.8 \times 10^7$ | $2.5 \times 10^7$ | $2.7 \times 10^6$ | $2.7 \times 10^6$ |
|  | NCO/OH | 1.0 | 1.0 | 1.0 | 1.0 | 1.0 | 1.0 | — | — |
| Layer (C) | Type | VM-PET | Ny | PET | PET | PET | PET | PET | PET |
| Laminate | Forming property | ○ | ○ | ○ | ○ | ○ | ○ | ○ | ○ |
|  | Tear strength (N) | 15 | 15 | 18 | 15 | 28 | 32 | 19 | 23 |
|  | Peel appearance | ○ | ○ | ○ | ○ | Δ | Δ | ○ | Δ |
|  | Bag ruptured strength kPa | 28 | 28 | 31 | 31 | 29 | 31 | 27 | 21 |
|  | Opening appearance (%) | 100 | 95 | 100 | 100 | 75 | 70 | 100 | 90 |

Comparative Example 1

Preparation of a laminate film was attempted in the same manner as in Example 1 except that as the polyolefin (A), the polyolefin (A-4) was used, and the thickness of the layer (A) was 20 μm, however, a stable laminate film could not be prepared.

Comparative Example 2

Preparation of a laminate film was attempted in the same manner as in Example 1 except that as the polyolefin (A), the polyolefin (A-3) was used, and the thickness of the layer (A) was 30 μm, however, the appearance when the sealing portion was peeled was poor.

Comparative Example 3

A laminate film was prepared in the same manner as in Example 5 except that as the polyolefin (A), the polyolefin (A-3) was used, and as the adhesive, an adhesive blended in the following ratio was used, and physical properties of the obtained laminate film were evaluated, whereupon the opening strength was high.
Adhesive:
A polyester-based polyurethane resin (manufactured by Tosoh Corporation, tradename: NIPPOLLAN 3228) and a polyisocyanate (manufactured by Tosoh Corporation, tradename: CORONATE L) were mixed in a weight ratio of 100/10 and diluted with ethyl acetate so that the solid content concentration would be 7%.

Comparative Example 4

A laminate film was prepared in the same manner as in Comparative Example 3 except that as the polyolefin (A), a high pressure low density polyethylene (manufactured by Tosoh Corporation, tradename: Petrothene 203) having melt mass flow rate of 8 g/10 min and density of 919 kg/m$^3$ was used, and physical properties of the obtained laminate film were evaluated, whereupon the opening strength was high.

Comparative Example 5

A laminate film was prepared in the same manner as in Example 5 except that as the adhesive, an adhesive blended in the following ratio was used, and physical properties of the obtained laminate film were evaluated, whereupon the opening strength was high.
Adhesive:
A polyester-based polyurethane resin (manufactured by Tosoh Corporation, tradename: NIPPOLLAN 3228) and a polyisocyanate (manufactured by Tosoh Corporation, tradename: CORONATE HL) were mixed in a weight ratio of 100/15 and diluted with ethyl acetate so that the solid content concentration would be 7%.

Comparative Example 6

A laminate film was prepared in the same manner as in Example 5 except that as the adhesive, an adhesive blended in the following ratio was used, and physical properties of the obtained laminate film were evaluated, whereupon the opening strength was high, and the peel appearance was poor.
Adhesive:
A polyester-based polyurethane resin (manufactured by Tosoh Corporation, tradename: NIPPOLLAN 3228) and a polyisocyanate (manufactured by Tosoh Corporation, tradename: CORONATE HL) were mixed in a weight ratio of 100/2 and diluted with ethyl acetate so that the solid content concentration would be 7%.

TABLE 3

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Layer (A) | Type | (A-4) | (A-3) | (A-3) | Petrothene 203 | (A-3) | (A-3) |
|  | MFR (g/10 min) | 34 | 15 | 15 | 8 | 15 | 15 |
|  | Density (kg/m$^3$) | 933 | 931 | 931 | 919 | 931 | 931 |
|  | Thickness (μm) | 20 | 30 | 20 | 20 | 20 | 20 |
|  | Oil resistance (%) | 1.1 | 1.0 | 1.0 | 6.4 | 1.0 | 1.0 |

TABLE 3-continued

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Layer (B) | Base compound/curing agent | — | 100/5 | 100/10 | 100/10 | 100/20 | 100/2 |
|  | Thickness (μm) | — | 0.5 | 0.5 | 0.5 | 0.5 | 0.5 |
|  | Glass transition temperature (° C.) | — | −15 | 1 | 1 | 11 | −32 |
|  | Storage modulus (Pa) | — | $1.1 \times 10^7$ | $2.6 \times 10^7$ | $2.6 \times 10^7$ | $3.5 \times 10^7$ | $0.7 \times 10^5$ |
|  | NCO/OH | — | 1.0 | 2.0 | 2.0 | 4.0 | 0.4 |
| Layer (C) | Type | PET | PET | PET | PET | PET | PET |
| Laminate | Forming property | × | ○ | ○ | ○ | ○ | ○ |
|  | Tear strength (N) | — | 29 | 46 | 60 | 90 | 4 |
|  | Peel appearance | — | × | × | × | × | × |
|  | Bag ruptured strength (kPa) | — | 7 | 38 | 39 | 50 | 15 |
|  | Opening appearance (%) | — | 35 | 50 | 35 | 20 | 50 |

The present invention has been described in detail with reference to specific embodiments, but, it is obvious for the person skilled in the art that various changes and modifications are possible without departing from the intension and the scope of the present invention.

The entire disclosure of Japanese Patent Application No. 2014-219398 filed on Oct. 28, 2014 including specification, claims and summary is incorporated herein by reference in its entirety.

The invention claimed is:

1. A laminate comprising at least three layers (A), (B) and (C) in this order, wherein the layer (A) is composed of a polyolefin which satisfies the following requirements (a) to (c), the layer (B) is composed of an adhesive which satisfies the following requirements (d) to (f) and is either a two component curable polyurethane adhesive comprising a polyol component as a base compound and an isocyanate component as a curing agent or a polybutadiene adhesive, and the layer (C) is a substrate comprising at least one layer:
(a) density measured in accordance with JIS K6922-1 of from 900 to 970 kg/m³,
(b) melt mass flow rate (MFR) measured in accordance with JIS K6922-1 of from 2 to 30 g/10 min,
(c) film thickness of from 5 to 25 μm,
(d) film thickness of from 0.01 to 3.0 μm,
(e) glass transition temperature measured in accordance with JIS K7121 of from −30 to +10° C., and
(f) storage modulus E' at 20° C. at a frequency of 10 Hz of from $1.0 \times 10^6$ to $2.5 \times 10^7$ Pa.

2. The laminate according to claim 1, wherein the layer (A) is a film formed by extrusion coating on the layer (C) via the layer (B).

3. The laminate according to claim 1, wherein the layer (B) is composed of a two component curable polyurethane adhesive comprising a polyol component as a base compound and an isocyanate component as a curing agent.

4. The laminate according to claim 3, wherein the isocyanate component is an aliphatic isocyanate.

5. The laminate according to claim 3, wherein the ratio (NCO/OH) of the number of isocyanate groups of the isocyanate component to the number of hydroxy groups (OH) of the polyol component is from 0.5 to 2.5.

6. The laminate according to claim 1, wherein the MFR of the polyolefin for the layer (A) measured in accordance with JIS K6922-1 is from 10 to 30 g/10 min.

7. The laminate according to claim 1, wherein the density of the polyolefin for the layer (A) measured in accordance with JIS K6922-1 is from 927 to 942 kg/m³.

8. The laminate according to claim 1, wherein the polyolefin for the layer (A) is a composition comprising from 10 to 90 wt % of a high density polyethylene (1) and/or a copolymer (2) of ethylene and an α-olefin having at least 4 carbon atoms, having a density of less than 940 kg/m³, and from 10 to 90 wt % of a high pressure low density polyethylene (3) (the total amount of (1), (2) and (3) is 100 wt %).

9. The laminate according to claim 1, wherein the polyolefin for the layer (A) is a composition comprising from 10 to 70 wt % of a high density polyethylene (1), from 5 to 80 wt % of a copolymer (2) of ethylene and an α-olefin having at least 4 carbon atoms, having a density of less than 940 kg/m³, and from 10 to 85 wt % of a high pressure low density polyethylene (3) (the total amount of (1), (2) and (3) is 100 wt %).

10. The laminate according to claim 1, wherein the substrate as the layer (C) is a film of at least one member selected from the group consisting of a polyester, a polyamide, a polypropylene, a saponified ethylene/vinyl acetate copolymer and a polyvinyl alcohol.

11. The laminate according to claim 1, wherein the substrate as the layer (C) is at least one vapor-deposited film having a vapor-deposited thin layer composed of a metal or metal oxide of aluminum, alumina or silica.

12. The laminate according to claim 1, wherein the substrate as the layer (C) is a biaxially oriented polyester film or polyamide film having an aluminum vapor-deposited layer.

13. The laminate according to claim 1, wherein when a press-formed product (150 mm×150 mm×1 mm) of the polyolefin for the layer (A) is immersed in edible oil at 60° C. for 24 hours, the weight change is at most 1.2%.

14. A package comprising the laminate as defined in claim 1.

15. The package according to claim 14, wherein the package is a pillow bag having an opening strength of from 5 to 25 N, which is obtained by heat-sealing the layer (A) to itself by a heat sealer at from 125° C. to 140° C.

16. The package according to claim 14, which is for packaging a fat-and-oil component-containing content.

* * * * *